United States Patent [19]

Claassen

[11] Patent Number: 5,597,156
[45] Date of Patent: Jan. 28, 1997

[54] MODULAR FOLDED SHEET CONVEYOR SYSTEM

[75] Inventor: Robert D. Claassen, Medford, Oreg.

[73] Assignee: MasterFlo Technology, Inc., Brossard, Canada

[21] Appl. No.: 334,267

[22] Filed: Nov. 3, 1994

[51] Int. Cl.⁶ ..................................................... B65H 5/00
[52] U.S. Cl. .......................... 271/225; 271/280; 271/285; 271/184; 198/575; 198/583
[58] Field of Search ............................ 271/184, 198, 271/225, 273, 274, 275, 280–286, 250–252; 198/575, 576, 583, 831, 839

[56] References Cited

U.S. PATENT DOCUMENTS

| | | | |
|---|---|---|---|
| 1,380,691 | 6/1921 | Tuohy | 198/583 |
| 1,891,782 | 12/1932 | Sager | 271/198 X |
| 3,355,006 | 11/1967 | Heilbrunn | 271/274 X |
| 4,629,058 | 12/1986 | Reissmann et al. | 198/575 X |
| 4,925,009 | 5/1990 | Hill | 198/583 |
| 5,083,657 | 1/1992 | Kelsey | 198/839 X |
| 5,112,041 | 5/1992 | Honegger | 271/184 X |
| 5,180,154 | 1/1993 | Malick | 271/225 X |
| 5,433,430 | 7/1995 | Straessler et al. | 271/225 |

FOREIGN PATENT DOCUMENTS

| | | | |
|---|---|---|---|
| 578614 | 1/1994 | European Pat. Off. | 271/225 |
| 677480 | 5/1991 | Switzerland | 271/184 |

Primary Examiner—Boris Milef
Attorney, Agent, or Firm—Chernoff, Vilhauer, McClung & Stenzel

[57] ABSTRACT

A modular conveyor system for flat folded product includes a generally trapezoidal central drive unit having an upper endless belt conveyor which extends at an obtuse angle to first and second edges thereof. The central drive unit includes a drive motor for driving its endless belt conveyor and further includes first and second output pulleys. First and second auxiliary driven units each have a substantially rectangular frame which supports an endless belt conveyor where each endless belt conveyor is driven by an input pulley coupled to the first and second output pulleys respectively. The three units may be locked together in various configurations to form a deserter, a bump turn or a lateral realigner.

14 Claims, 10 Drawing Sheets

MODULAR FOLDED SHEET CONVEYOR SYSTEM

BACKGROUND OF THE INVENTION

The present invention relates a system for conveying folded sheets in shingled relationship and in particular to folded sheets nested together into a common shingled stream.

In the printing industry such as the newspaper printing industry, it is conventional to place advertising inserts into newspapers. The inserts may be in the form of printed sheet items comprised of one or more folded sheets. The folded sheet items are stacked and later placed one at a time into newspapers. It is common in such operations to print duplicates of newspaper advertisements and the like and to nest the duplicates together as a folded sheet with one of the duplicate folded sheets having an exposed leading edge. Even when duplicates are not created in this manner, the output of a conventional printing press for folded sheets is a shingled stream of material which must be conveyed from the printing press to other locations such as a conventional stacking mechanism which rearranges the shingle stream into vertical stacks of folded items.

In order to convey the shingled stream from one place to the next, conveyors such as endless belt conveyors are frequently employed. Because it cannot be assumed that the destination for the shingled stream lies along a straight line at some distance from the printing press, such conveyor systems must often force the stream to make angled turns or in some cases 90° turns depending upon plant configuration. For example, a 90° turn in a conveyor system conveying a shingled stream of folded product is conventionally called a "bump" turn. Problems experienced with a typical bump turn include inconsistent shingle alignment and crooked delivery upon exit. This can cause jams at trimmer mechanisms which result from stream hesitation and the piling up of the product at the bump turn.

Sometimes the product stream needs to be realigned. That is, it is necessary to move the conveyor stream laterally but maintain the stream flow in essentially the same direction. Conventionally, flow turns and additional conveyors are needed to accomplish this function. Many of the problems associated with bump turns are also applicable to those experienced with stream realignment.

When product from the printing press is configured in nested relationship, as described above it, is frequently desirable to separate the nested product into two independent product streams. Machines for performing this function are commonly called deserters. An example of such a device is shown in U.S. Pat. No. 4,477,066 to Fischer, et al. The device shown in the Fischer patent extracts a nested folded sheet from a shingled stream by employing a nip roller which extends at an angle to the shingled stream which pinches a nonoverlapped sheet pulling it out to the side while conveyor belts continue to move the shingled stream, and the new stream consisting of the removed sheets, forward. The conveyor belts underneath the nip roller are oriented in a forward direction which means that the speed of the nip roller must be precisely set so that it includes a forward component of motion which exactly matches the speed of the conveyor belts. The problem with such a system is that the product is not always cleanly extracted and must still move crosswise to the conveyor belts. This can result in tearing, misalignment or bunching of the removed inserts from the shingled stream.

SUMMARY OF THE INVENTION

The present invention comprises a modular conveyor system for a shingled stream of folded product which may be configured as a realigner, a bump turn or a deserter. The system comprises a three piece modular system including a generally trapezoidal central drive unit having a frame supporting at least one endless belt conveyor extending at an obtuse angle to first and second angled edges, and a drive motor housed within the frame coupled to the endless belt conveyor and including a pair of output pulleys. First and second driven units each include a substantially rectangular frame and both support an endless belt conveyor which is driven by an input pulley which is coupled to one of the output pulleys of the drive unit.

The central drive unit includes coupling links for urging the drive unit into snug engagement with the first and second driven units along its first and second angled edges. The coupling links may include hooks connected to locking levers and the central drive unit may further include resilient pads for receiving frame portions of the first and second driven units to provide snug engagement therewith when the locking levers are engaged. The angle of the obtuse first and second edges is preferably 45°.

The first and second driven units each include a bracket situated adjacent each respective endless conveyor belt for receiving either a nip roller or a bump wall, depending upon the application for the system. When the system is configured as a deserter, the central drive unit is coupled to the first and second driven units such that the first edge of the central drive unit is aligned parallel to the conveyor belt of the first driven unit and the second edge of the central drive unit is aligned perpendicular to the conveyor belt of the second driven unit. The central drive unit in the deserter configuration includes a passive nip roller extending in alignment with an endless toothed belt to form a pinch roller. The pinch roller has a drive speed that is about 5% in excess of the forward drive speed of the endless belt conveyor of the first driven unit in addition to a speed factor compensating for the 45° angle at which the trapezoidal central drive unit engages the endless conveyor belt of the first driven unit. The first driven unit is adapted to be placed in line with the output conveyor from the printer unit and establishes the "forward" direction of travel of the shingled stream. The pinch roller of the central trapezoidal drive unit engages an edge of a duplicate outer folded product in a shingled stream and draws the outer folded product out to the side at a 45° angle all the while moving it forward without realigning its orientation relative to the direction of travel. At the opposite end of the central trapezoidal drive unit the second driven unit is coupled so that its endless belt conveyor extends perpendicular to the second edge of the drive unit. This reestablishes the original forward direction for the deserted folded product so that it can be placed on a conveyor parallel to the original conveyor for delivery to a stacker or the like.

When configured as a bump turn, both the first and second driven units are coupled to the central drive unit so that their respective conveyor belts extend substantially perpendicular to the edges of the central drive unit. Thus, each driven unit is coupled at a 45° angle to the direction of its endless conveyor and the two 45° angle turns provide a right angle change in the direction of travel of the shingled stream. When the shingled stream is engaged by the pinch rollers on the central drive unit the stream is not realigned but moves across the central drive unit, at its original angle. When it is deposited on the second driven unit, the product once again assumes the original alignment of the shingle stream only diverted at a 90° angle.

In a lateral realigner configuration the system is assembled similar to that used as a deserter except the input end is a driven unit having its endless belt conveyor extending perpendicular to an edge of central drive unit. The second driven unit is coupled to the other edge of the central drive unit so that its endless conveyor extends parallel to the second edge. The effect of this configuration is, therefore, to realign the conveyor to move the direction of travel laterally.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
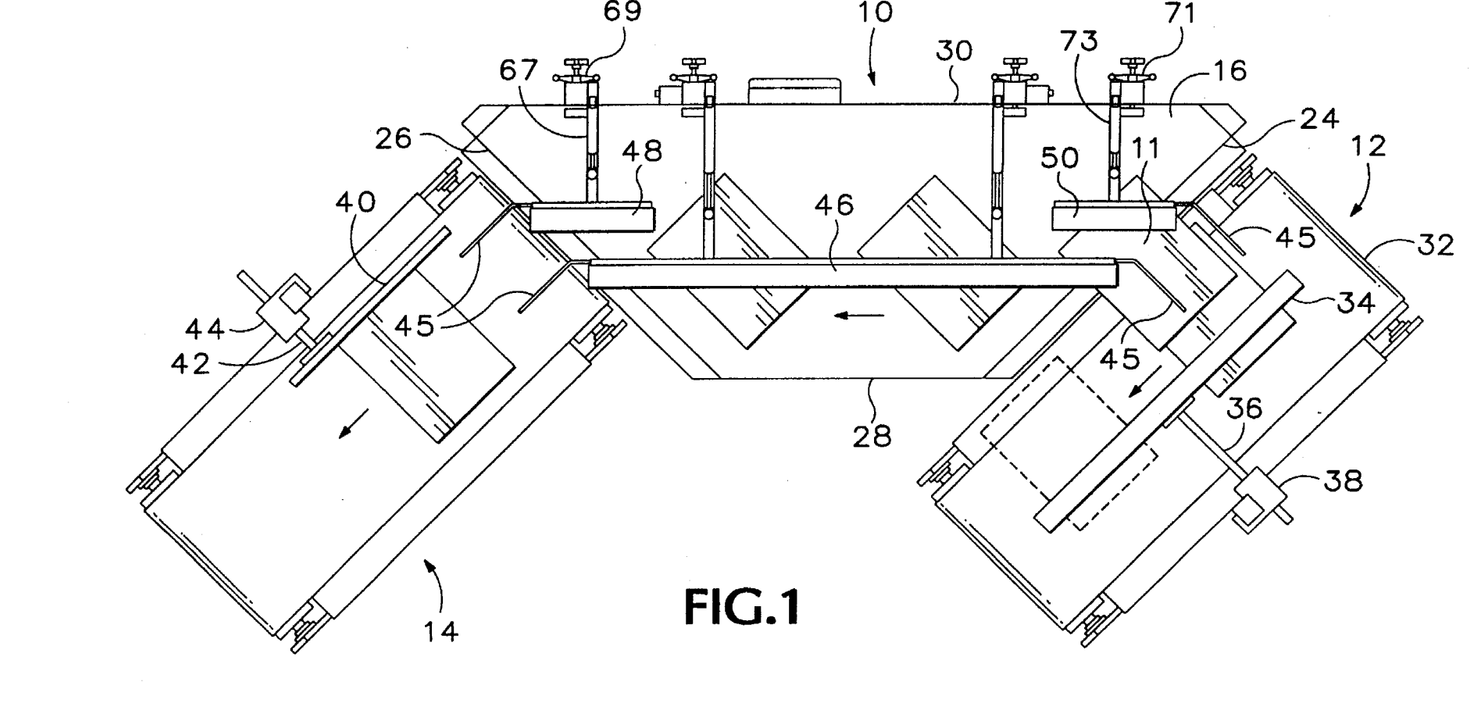
FIG. 1 is a top view of the modular conveyor system of the invention configured as a deserter.

The invention described herein is a modular system which is capable of at least three basic configurations to achieve three different objectives. FIG. 1 shows the invention configured as a deserter. The modular system of the invention comprises a central trapezoidal drive unit 10 and two auxiliary or driven units 12 and 14. These units are passive in that they are powered by output drive belts from the central unit 10. The central drive unit 10 is essentially a conveyor table having a flat upper surface 16 supported on a frame 18 (see FIG. 6). The frame includes legs 20 which may include wheels or casters 22 for portability. The flat upper surface 16 includes first and second edges 24 and 26 that extend at a 45° angle to front and rear edges 28 and 30. The direction of travel across the surface 16 is in the direction of the arrow in FIG. 1 so that material conveyed across the surface 16 always travels at a 45° angle with respect to the first and second edges 24 and 26 respectively. In a deserter configuration the first edge 24 is aligned parallel to the direction of travel of a conveyor belt 32 which extends over the upper flat surface of the first driven unit 12. Coupling members (described below) secure the driven unit 12 to the drive unit 10 along the first edge 24 so that the edge 24 is parallel to the direction of travel of the conveyor belt 32 as indicated by the arrow drawn on the unit 12. Also in the deserter configuration the unit 12 includes a idler pinch roller assembly 34 which is mounted on a rod 36 which is in turn coupled to a bracket 38 which is included on each of the driven units 12 and 14. The driven unit 12 provides the stream input to the central drive unit 10 in the deserter configuration. The stream output is at driven unit 14. The units 14 and 12 are in all respects identical except that in certain configurations different tools are used along the top surface conveyor belt of each. For example, in the deserter configuration of FIG. 1 the output driven unit 14 employs a vertical bump wall 40 which is coupled by way of rod 42 to a side bracket 44. The bump wall 40 aids in realigning the shingled stream as it is conveyed from the central drive unit 10 to the driven output unit 14.

In actual operation a shingled stream (shown as a series of single sheets spaced apart for ease of illustration) is received by the input unit 12 from a printer or other output conveyor (not shown). The shingled stream includes overlapping duplicate sheets, one of which has a nonoverlapping edge that projects slightly to the side. As the sheets are carried across the driven unit 12 by its conveyor belt 32, the outside edge of the outer sheet 11 is engaged by a pinch roller 46. The pinch roller pulls the outer sheet 11 away from the shingled stream at a 45° angle across the top of the central drive unit 10. The central drive unit 10 also includes two other shorter pinch roller units 48 and 50, the operation of which will be explained below. These units are not used in the deserter configuration.

Figure 2:
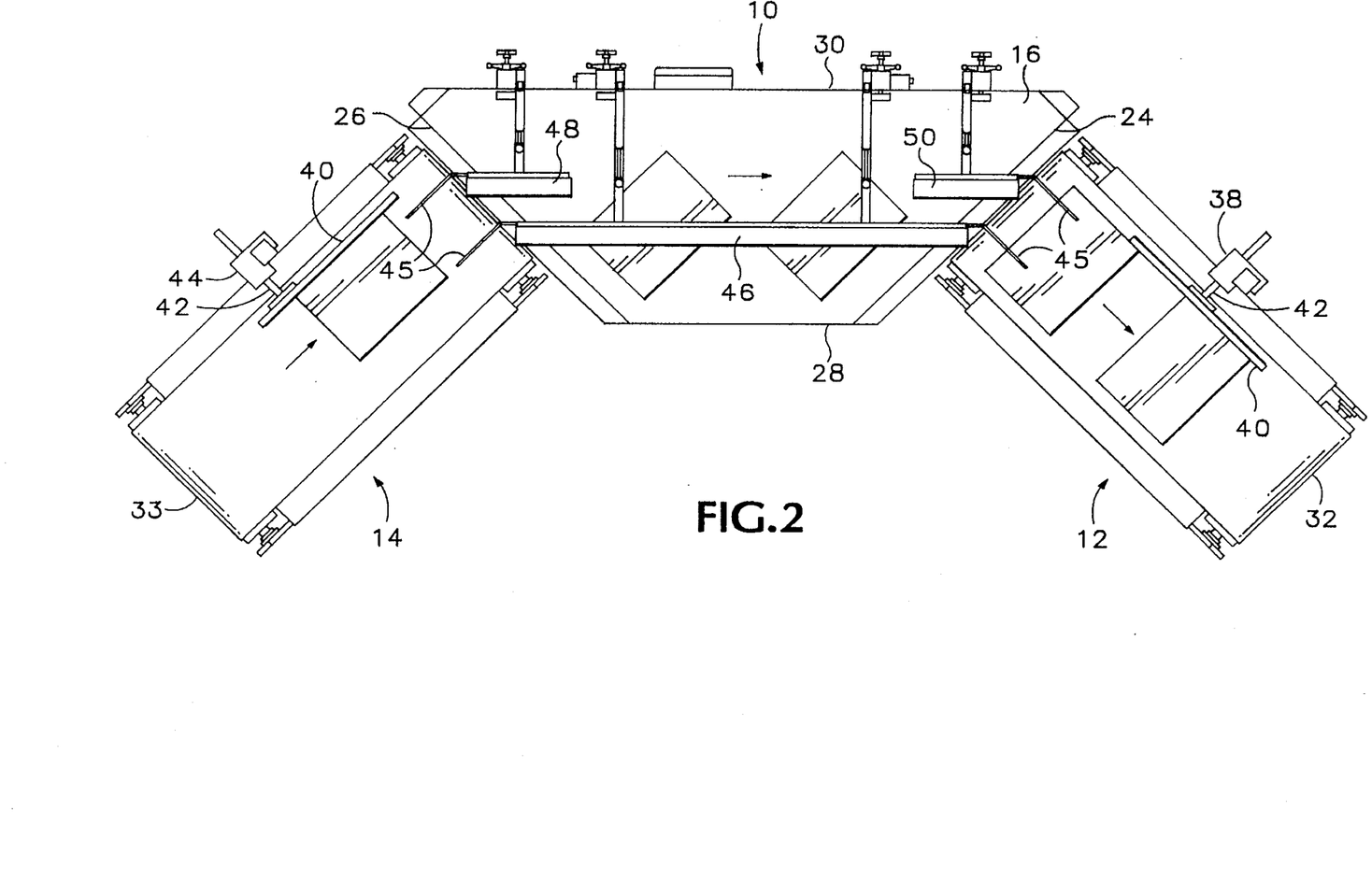
FIG. 2 is a top view of the modular conveyor system of the invention configured as a bump turn.

The bump turn configuration is illustrated in FIG. 2. In this configuration unit 14 becomes the input unit and is coupled to the drive unit 10 so that a conveyor belt 33 conveys folded material along a line (shown by the arrow) perpendicular to the edge 26 of the drive unit 10. Pinch rollers 46 and 48 take up the sheets of the shingled stream and without turning the sheets divert them along a 45° angle to unit 12 which is now aligned as an output conveyor. The conveyor belt 32 is likewise connected to the drive unit 10 along its other edge 24 so that the direction of travel of the sheets is perpendicular to the edge 24. Thus by making two 45° angles the modular conveyor system creates a full right angle turn for the shingled stream of folded material.

Figure 3:
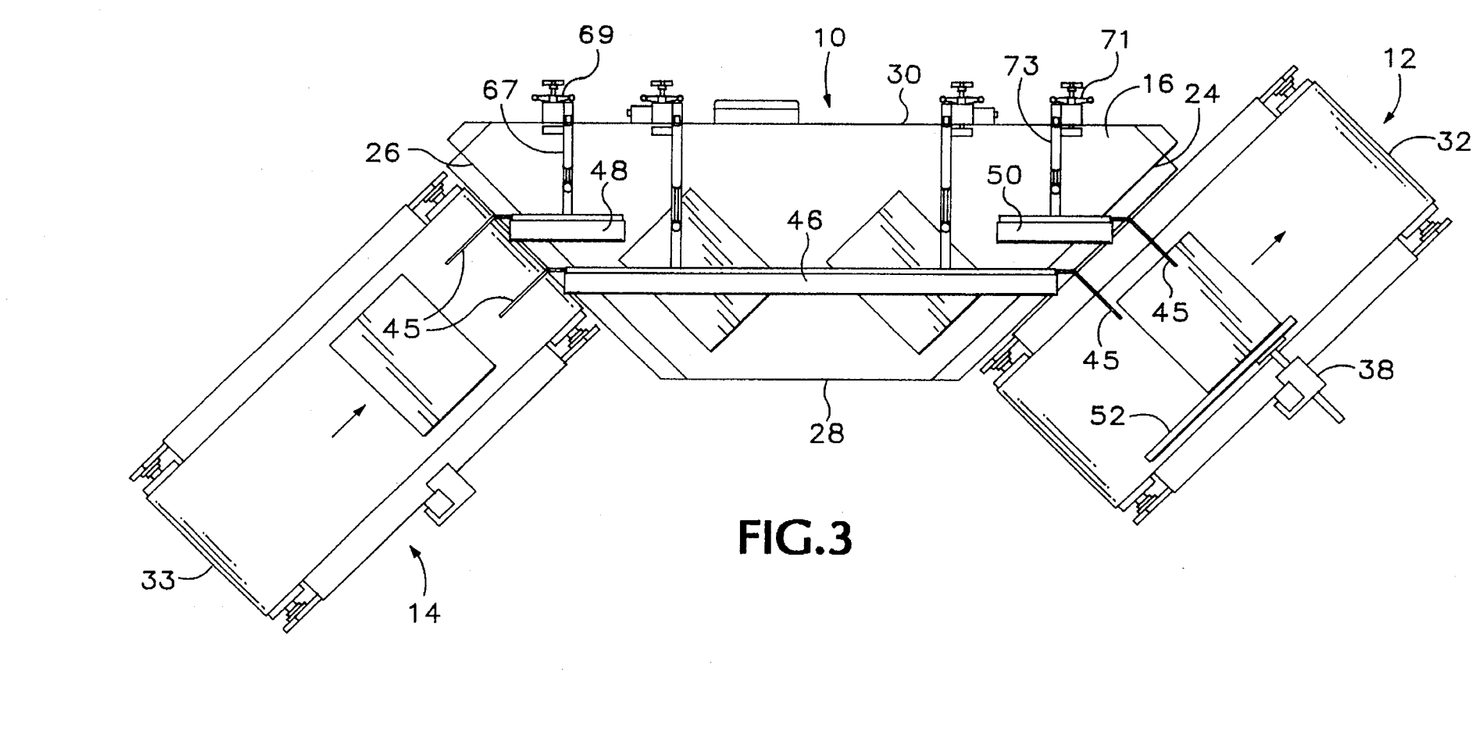
FIG. 3 is a top view of a modular conveyor system of the invention configured as a realigner.

In FIG. 3 the modular conveyor system is shown in a configuration to provide a lateral realignment of a shingled stream. In this configuration the driven unit 14 provides an input to the central drive unit 10 so that the conveyor belt 33 extends perpendicular to the edge 26. The pinch rollers 48 and 46 take up the sheets of the shingled stream and pinch roller 46 conveys them across the surface 16 to the driven unit 12 whose direction of travel now extends parallel to the opposite edge 24 of the drive unit 10. In this configuration the driven output unit 12 includes a bump wall 52 which is attached to its side bracket 38. Through the use of two 45° angle turns this configuration moves the shingled stream sideways without actually turning or reorienting the folded sheets of material.

Figure 4:
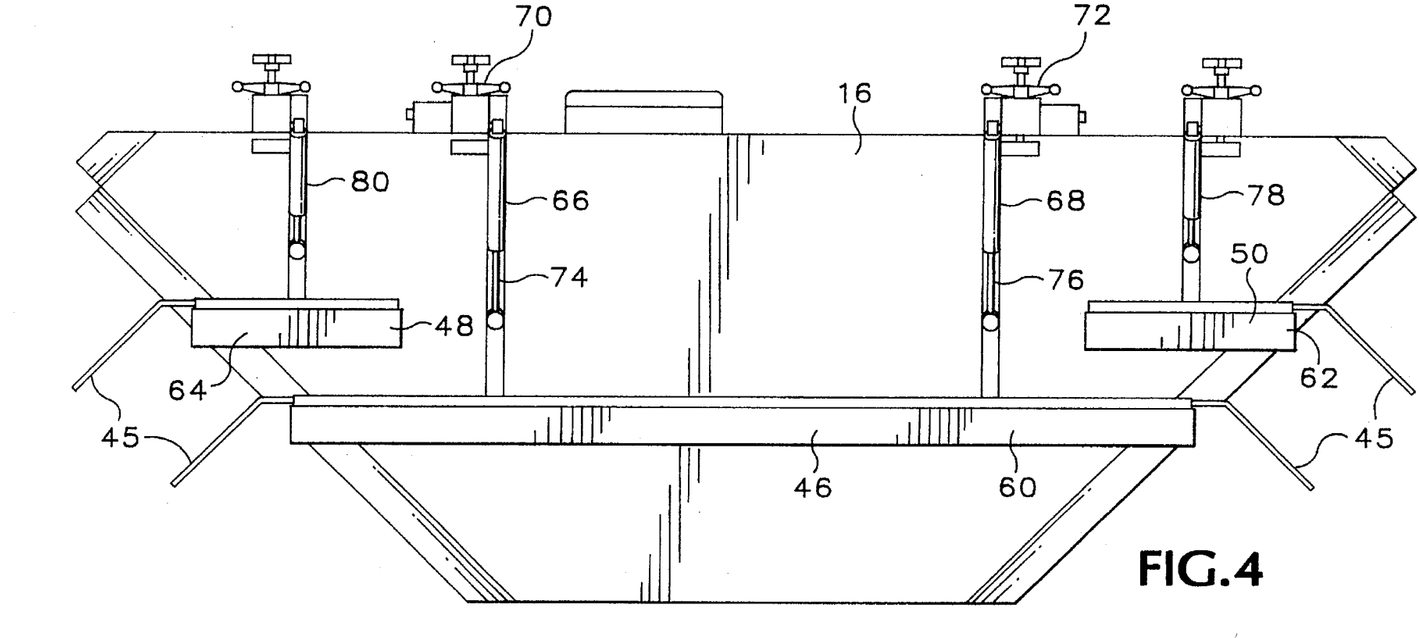
FIG. 4 is a top view of the central drive unit.
Figure 5:
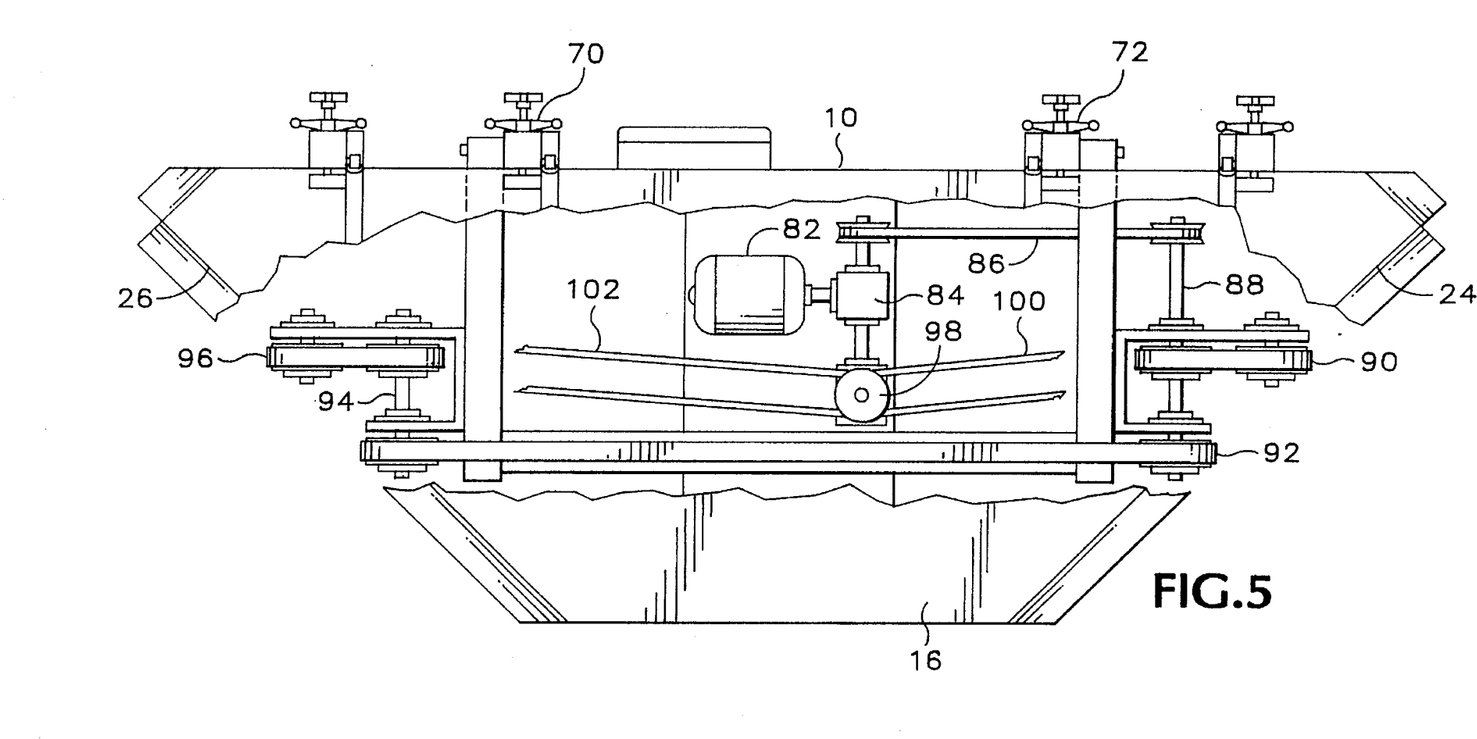
FIG. 5 is a partially cutaway top view of the central drive unit of FIG. 4.
Figure 6:
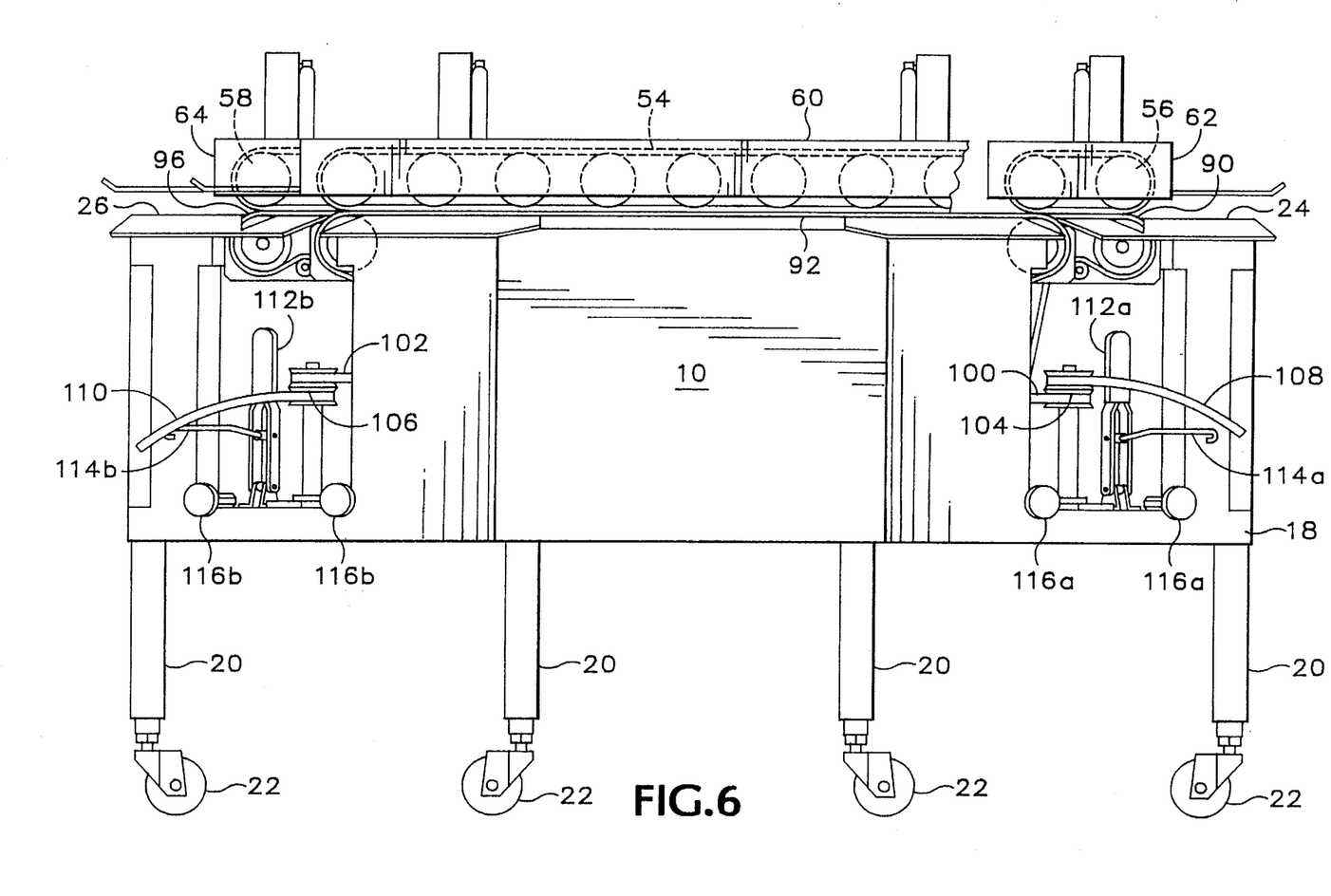
FIG. 6 is a side elevation view of the central drive unit of FIG. 4.
Figure 7:
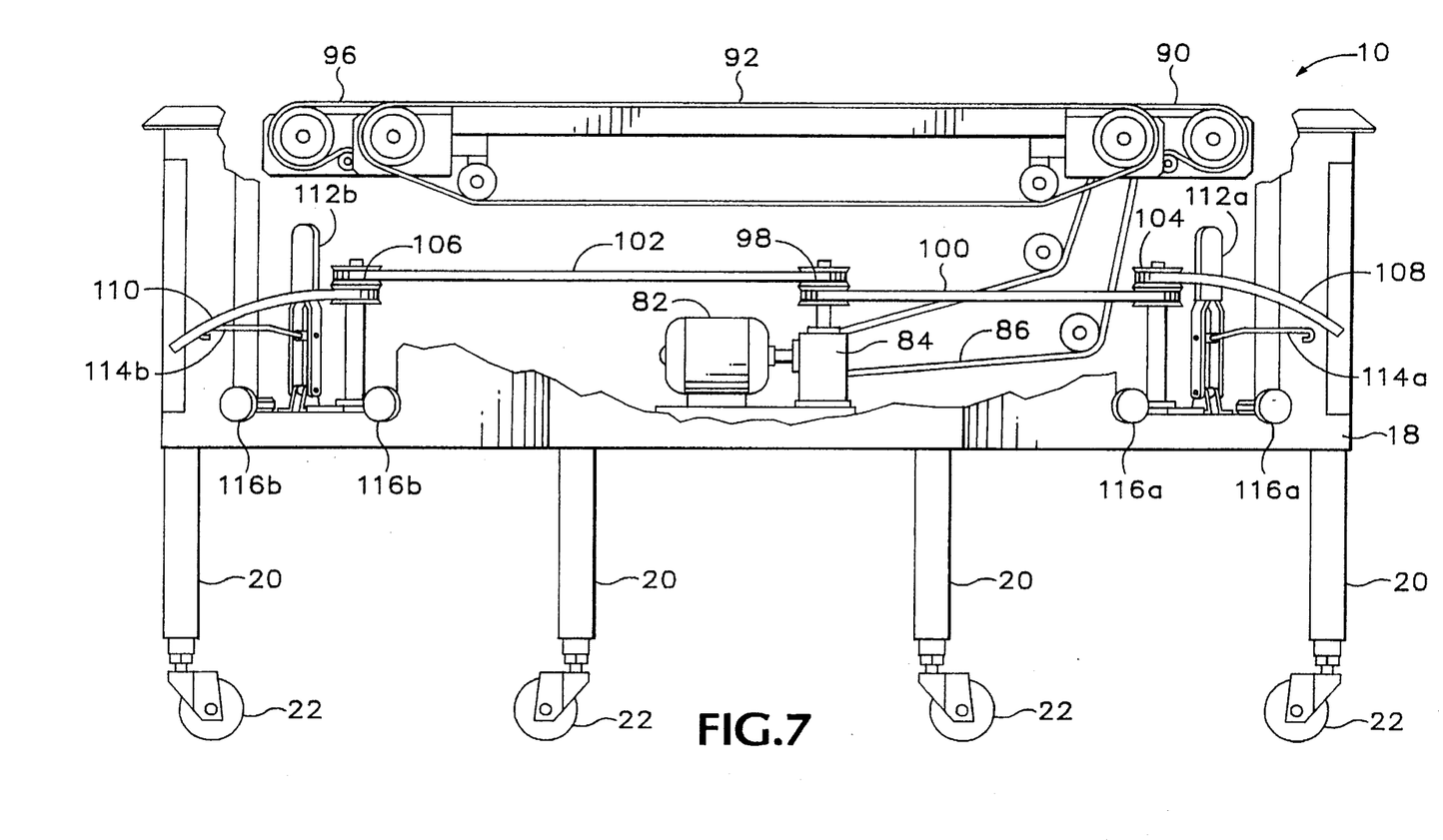
FIG. 7 is a partially cutaway side elevation view of the central drive unit of FIG. 6.

Reference is now made to FIGS. 4, 5 and 6 which show the details of operation of the central drive unit 10. The pinch rollers 46, 48 and 50, respectively, each comprise upper endless idler belts 54, 56 and 58 respectively supported on rollers within housings 60, 62 and 64, respectively. At each end of the pinch rollers metal guides 45 are provided which keep the product pressed onto the conveyor belts. The pinch roller 46 is supported above the surface 16 by a pair of adjustment rod assemblies 66 and 68 respectively. The adjustment rod assembly 66 and 68 cause the housing 60 to be raised and lowered by turning rotary handles 70 and 72. This is accomplished by the action of threaded bolts 74 and 76 respectively that are pinned against rigid bars at an angle so that turning the handles 70 and 72 causes the rigid bars to rotate around a pin (not shown) coupled to the frame 18 thus raising and lowering the housing 60. The same mechanism is employed with respect to rod assembly 78 that is used with pinch roller 50 and rod assembly 80 which is used with pinch roller 48. All three of the pinch rollers are driven by toothed belts which are shown in FIG. 5. The toothed belts are disposed directly vertically under the idler belts 54, 56 and 58 respectively so that folded material is pinched between the upper and lower belts.

A motor 82 is coupled to a gear box 84 which drives a transmission belt 86. The transmission belt 86 is in turn coupled to a shaft 88. The shaft 88 drives a toothed belt 90 which is associated with pinch roller 50 and a longer belt 92 which is associated with pinch roller 46. The toothed belt 92 is in turn coupled to another shaft 94 which drives a toothed belt 96 which is associated with the pinch roller 48.

The gear box 84 is also coupled to a pulley 98 which includes two belts 100 and 102 respectively which are coupled to idler pulleys 104, 106 respectively. The idler pulleys have output belts 108, 110 which are for attachment to the driven units 12 and 14 respectively.

The central drive unit 10 is intended to be snugly coupled to the driven units 12 and 14 respectively. Each of the angled sides of the drive unit (that is, those that coextensive with edges 24 and 26) have a coupler mechanism that hooks onto and attaches to the frames of the respective driven units 12 and 14. Overcenter levers 112a and 112b are pivotally connected to the frame 18. Each of the levers includes a hook member, 114a and 114b respectively, that urges the frame of each of the driven units 12 and 14 respectively against pairs of rubber pad members 116a and 116b respectively. Locking and unlocking the lever from its overcenter position as the hook engages the frame portions of driven units 12 and 14, respectively, serves to couple and decouple the central drive unit 10 from the driven units 12 and 14 in the various configurations.

Figure 9:
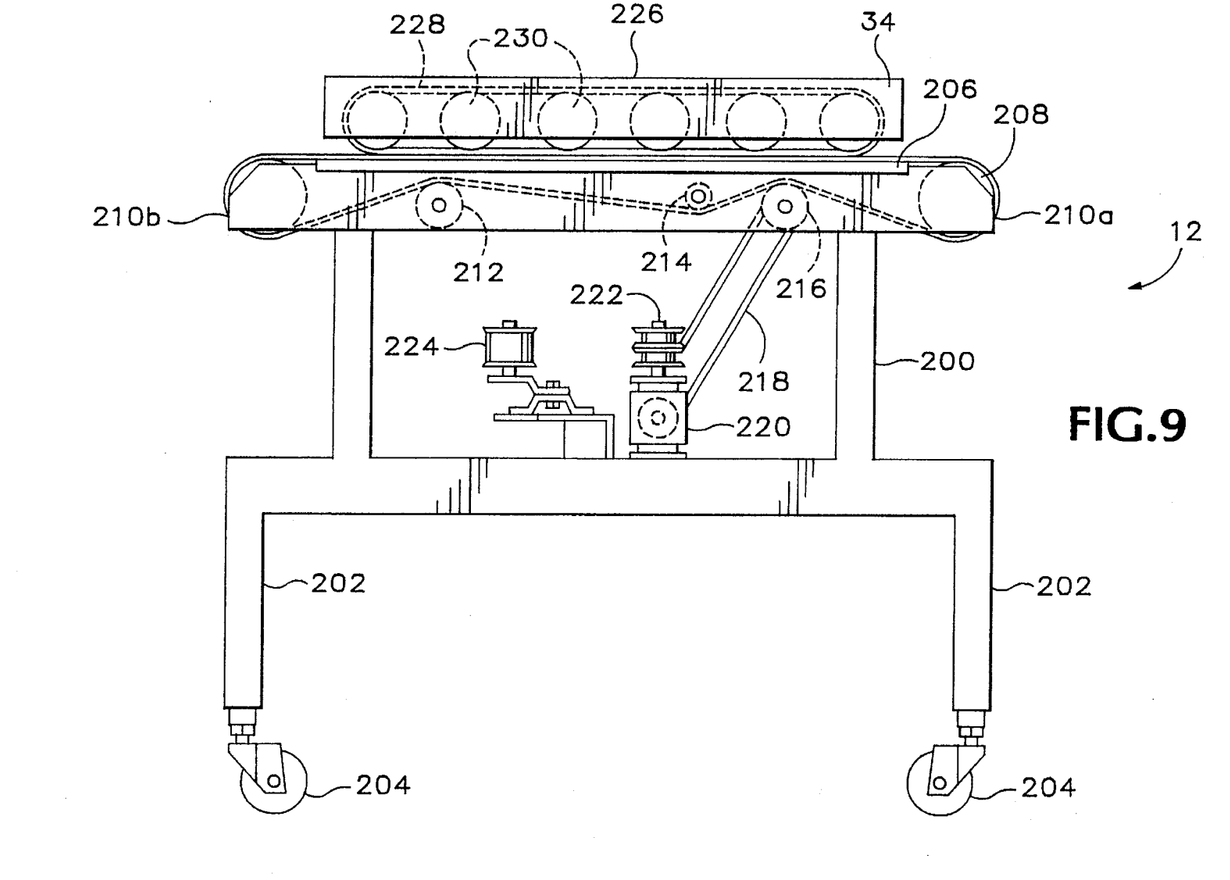
FIG. 9 is side elevation view of the driven unit of FIG. 8.

Referring to FIG. 9, the driven unit 12 is shown unattached to the central drive unit 10. The unit 12 is in all respects identical to unit 14 and includes a frame 200 having legs 202 with casters or wheels 204. The top surface of the unit 12 includes a flat top plate 206 that supports a wide endless conveyor belt 208. The conveyor belt 208 wraps around end rollers 210a and 210b and is threaded over idler rollers 212 and 214. A friction drive roller 216 is coupled by a belt 218 to a gear box 220. The gear box 220 receives an input from a pulley 222 which is coupled to an output belt (either belt 108 or belt 110) from the central drive unit 10 depending on the configuration and placement of the driven units 12 and 14. Also included adjacent the gearbox 220 is an idler pulley 224 to adjust tension. The driven unit 12 is shown in FIG. 9 with a pinch roller 34. The pinch roller 34 includes a housing 226 and a passive endless belt 228 threaded on rollers 230.

Figure 8:
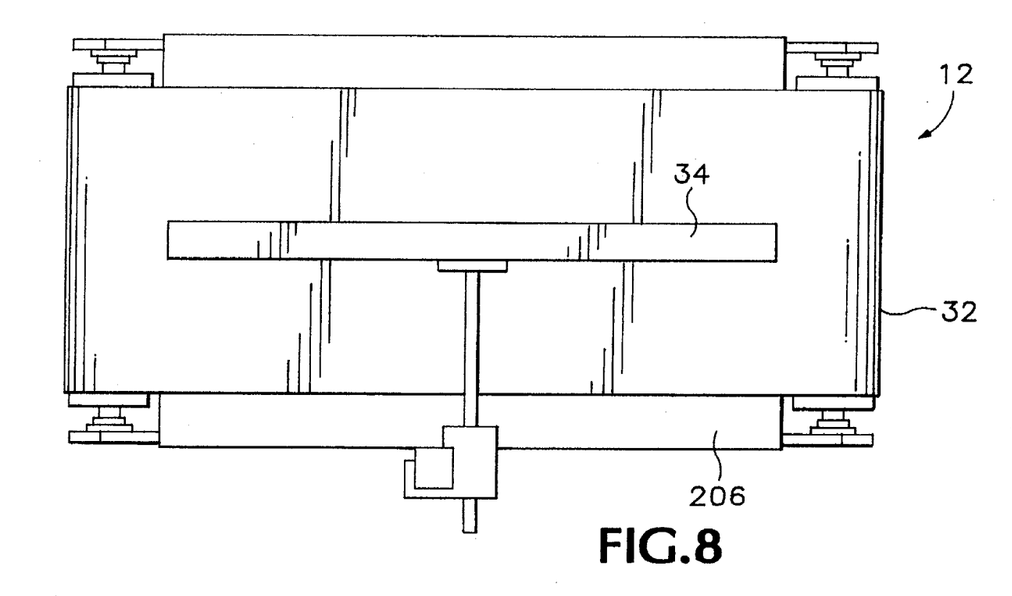
FIG. 8 is a top view of a driven unit employing an idler pinch roller.
Figure 8A:
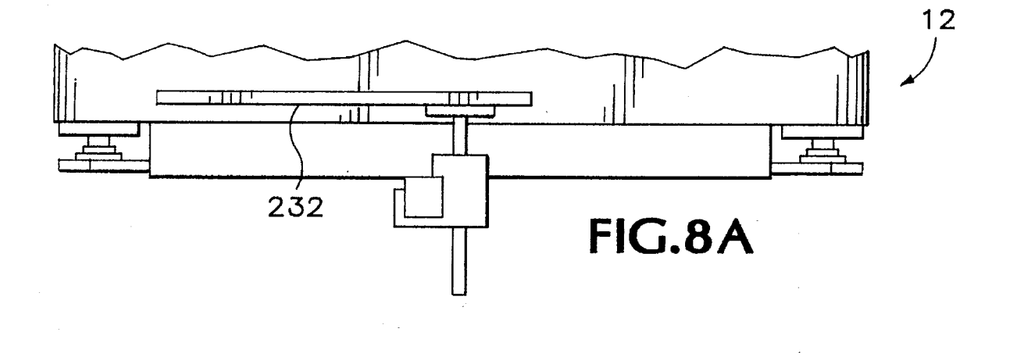
FIG. 8A is a partial top view of the driven unit of FIG. 8 employing a bump wall.

FIG. 8A shows the driven unit 12 in a different configuration where instead of a pinch roller a vertical bump wall 232 is provided.

Figure 10:
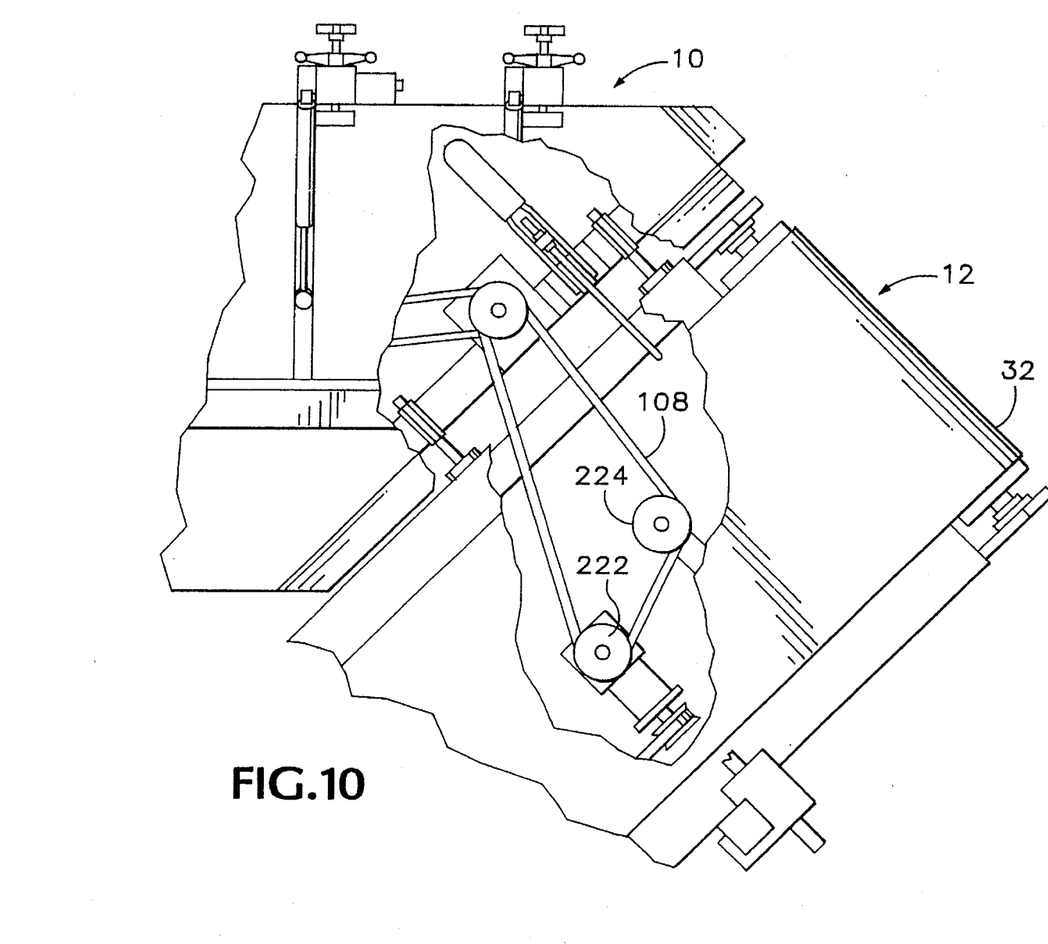
FIG. 10 is a partial partially cutaway top view of the drive unit coupled to one of the driven units in a deserter configuration.

FIG. 10 shows the driven unit 12 locked to the central drive unit 10 in the deserter configuration of FIG. 1. The output belt 108 from the central drive unit 10 is threaded around the idler pulley 224 and the input pulley 222. It is important to note that the pulleys are sized so that the pulley 222 is larger than the pulley 104. The different sizing provides a transmission differential so that the relative speeds of the belts 92, 90 and 96 will be different with respect to the conveyor belt 32. In the deserter configuration, in order to maintain a somewhat uniform forward speed of the shingled stream it is necessary for the belts of the central drive unit to be faster by a factor equal to the arc sine of 45°. In addition, it is advantageous to actually have the forward component of motion along the central drive unit 10 be faster than the forward motion of the stream along the conveyor belt 32. Thus, the pulleys 224 and 104 are sized relative to each other so that the pulley speed of the two belts 90, 92 and 96 is about 5% faster in addition to the increased speed factor provided by the arc sine of the 45° angle. The increased speed helps the pinch roller 46 extract the outer sheet 11 and pull it away from the nested folded product. This actually results in less slippage and misalignment of either of the shingled streams.

The smaller pinched rollers 48 and 50 and their associated toothed belts 90 and 96 are only used in two configurations. These rollers are engaged in the bump turn configuration of FIG. 2 and in the realignment configuration of FIG. 3. In both of those configurations the handles 69 and 71 respectively are turned which cause the support rods 80 and 78 respectively to lower the idler rollers 58 and 56 onto the toothed belts 90 and 96. The pinch rollers 48 and 50 are raised when the system is in the deserter configuration of FIG. 1.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A modular conveyor system for flat folded product including:

(a) a central drive unit having a trapezoidally shaped horizontal conveying surface said surface having a pair of parallel edges and first and second obtuse angled edges, said horizontal conveying surface including a main pinch roller and endless belt conveyor assembly extending substantially between said first and second obtuse angled edges, and parallel to said pair of parallel edges;

(b) a drive motor associated with said central drive unit coupled to said pinch roller and endless belt conveyor assembly;

(c) a first driven conveyor unit detachably connectable to said central drive unit and having a first substantially rectangular horizontal conveying surface including a first conveyor belt, said first driven conveyor unit being coupled to said central drive unit along said first obtuse angled edge of said central drive unit; and (c) a second driven conveyor unit detachably connectable to said central drive unit having a second substantially rectangular horizontal conveying surface including a second conveyor belt, said second driven conveyor unit being coupled to said central drive unit along said second obtuse angled edge of said central drive unit.

2. The modular conveyor system of claim 1 wherein an angle formed by an intersection of said first obtuse angled edge with one of said parallel edges is 45°.

3. The modular conveyor system of claim 1 wherein the central drive unit includes coupling links for detachably coupling said central drive unit to said first and second driven conveyor units.

4. The modular conveyor system of claim 1 wherein said central drive unit includes first and second output pulleys and said first driven conveyor unit and said second driven conveyor unit each include a driven input pulley coupled to said first and second output pulleys, respectively, for driving said first and second conveyor belts respectively.

5. The modular conveyor system of claim 3 wherein said coupling links include hooks adapted to engage frame members of said first and second driven conveyor units such that said first and second rectangular horizontal conveying surfaces on said first and second driven conveyor units, respectively, abut said central drive unit along said first and second obtuse angled edges, respectively, of said trapezoidally-shaped horizontal conveying surface.

6. The modular conveyor system of claim 1 wherein said first and second driven conveyor units each include a bracket situated adjacent said respective first and second horizontal conveying surfaces for receiving either a nip roller attachment or a bump wall attachment.

7. The modular conveyor system of claim 1 wherein said first and second driven conveyor units are coupled to said central drive unit so as to create a bump turn.

8. The modular conveyor system of claim 7 wherein the bump turn is a 90° bump turn.

9. The modular conveyor system of claim 1 wherein said first and second driven conveyor units are coupled to said central drive unit so as to create a realigner configuration.

10. The modular conveyor system of claim 3 wherein said first and second driven conveyor units are coupled to said central drive unit so as to create a deserter configuration.

11. The modular conveyor system of claim 1, wherein said central drive unit further includes an input pinch roller and an output pinch roller, both pinch rollers extending along said trapezoidally shaped horizontal conveying surface parallel to said pinch roller and endless belt assembly, said input pinch roller located substantially adjacent to said first obtuse angled edge and said output pinch roller located substantially adjacent to said second obtuse angled edge.

12. A modular conveyor system configured as a deserter for a shingled stream of nested flat folded product comprising:

(a) a central drive unit having a trapezoidally shaped horizontal conveying surface, said conveying surface including an endless belt and pinch roller assembly extending substantially between first and second edges of said conveying surface, said first and second edges extending at an obtuse angle with respect to said endless belt;

(b) a drive motor coupled to said endless belt and pinch roller assembly and further including at least a first output pulley;

(c) a first driven conveyor unit having a first substantially rectangular horizontal conveying surface including a conveyor belt driven at a base speed by a first input pulley coupled to said first output pulley, said first driven conveyor unit having a side edge parallel to a forward direction of travel of said conveyor belt, said side edge being aligned with and abutting said first obtuse angled edge of said central drive unit; and (d) said endless belt and pinch roller assembly of said central drive unit having a speed component directed parallel to said forward direction of travel that exceeds said base speed.

13. The modular conveyor system of claim 12 wherein said obtuse angle is approximately 135° and wherein the speed of said endless belt and pinch roller assembly is approximately 5% faster than the arcsin of 45° times said base speed.

14. The deserter of claim 12 further including a second driven conveyor unit having a second substantially rectangular horizontal conveying surface including a second conveyor belt driven by a second input pulley coupled to said drive motor through a second output pulley associated with said central drive unit, said second driven conveyor unit having a back edge perpendicular to a forward direction of travel of said second conveyor belt, said back edge being aligned with and abutting said second obtuse angled edge of said central drive unit.

* * * * *